(12) United States Patent
Thornley et al.

(10) Patent No.: US 9,747,182 B2
(45) Date of Patent: Aug. 29, 2017

(54) SYSTEM AND METHOD FOR IN-SERVICE DIAGNOSTICS BASED ON HEALTH SIGNATURES

(71) Applicant: DELL PRODUCTS L.P., Round Rock, TX (US)

(72) Inventors: Bryan James Thornley, Burnet, TX (US); Claude Lano Cox, Austin, TX (US); Nikhil Manohar Vichare, Austin, TX (US); Vinod Makhija, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 45 days.

(21) Appl. No.: 14/838,974

(22) Filed: Aug. 28, 2015

(65) Prior Publication Data

US 2016/0232069 A1    Aug. 11, 2016

Related U.S. Application Data

(63) Continuation of application No. 13/790,033, filed on Mar. 8, 2013, now Pat. No. 9,170,866.

(51) Int. Cl.
  *G06F 11/07*  (2006.01)
  *G06F 11/263*  (2006.01)
  *G06F 11/00*  (2006.01)
  *G06F 11/36*  (2006.01)

(52) U.S. Cl.
  CPC .......... *G06F 11/263* (2013.01); *G06F 11/00* (2013.01); *G06F 11/079* (2013.01); *G06F 11/0736* (2013.01); *G06F 11/0784* (2013.01); *G06F 11/3688* (2013.01); *G06F 11/3692* (2013.01)

(58) Field of Classification Search
  CPC .......... G06F 11/3096; G06F 11/3476; G06F 11/0736; G06F 11/0784; G06F 11/263; G06F 11/324; G06F 11/3409; G06F 11/3055; G06F 11/3688; G06F 11/3692
  See application file for complete search history.

(56) References Cited

U.S. PATENT DOCUMENTS

| | | | |
|---|---|---|---|
| 6,012,152 A | 1/2000 | Douik et al. | 714/26 |
| 6,499,114 B1 | 12/2002 | Almstead et al. | 714/25 |
| 6,738,928 B1 * | 5/2004 | Brown | G06F 11/2268 714/26 |

(Continued)

*Primary Examiner* — Nadeem Iqbal
(74) *Attorney, Agent, or Firm* — Baker Botts L.L.P.

(57) ABSTRACT

In accordance with the present disclosure, a system and method are herein disclosed for providing in-service diagnostics based on health signatures of an information handling system. In one embodiment, the health of an information handling system is periodically probed by a software agent running as a service. The service polls a set of probes from interfaces on the host system and tracks parameters indicative of system and component health and performance. An analytics engine processes the data to identify anomalies and outliers, and to detect signatures that are precursors to potential service incidents. A rule set matches signatures to potential actions. Based on the detected signatures and rule sets, the service is operable to select, schedule, and execute one or more diagnostic tests. If an information handling system or component thereof fails a diagnostic test, the results are archived to persistent storage and communicated to an administrator.

20 Claims, 10 Drawing Sheets

(56) References Cited

U.S. PATENT DOCUMENTS

| | | | |
|---|---|---|---|
| 6,826,714 B2 | 11/2004 | Coffey et al. ................... | 714/25 |
| 7,296,132 B1 * | 11/2007 | Gross .................. | G06F 11/3476 |
| | | | 707/999.101 |
| 7,809,985 B2 * | 10/2010 | Chen ................... | G06F 11/2268 |
| | | | 714/25 |
| 8,601,336 B2 | 12/2013 | Ohta et al. .................... | 714/748 |
| 2003/0125908 A1 * | 7/2003 | Wynn ..................... | G06F 11/26 |
| | | | 702/186 |
| 2005/0278143 A1 | 12/2005 | Wegerich et al. ............ | 702/182 |
| 2007/0088972 A1 * | 4/2007 | Srivastava ............ | G06F 11/326 |
| | | | 714/4.11 |
| 2007/0174726 A1 | 7/2007 | Nam et al. ...................... | 714/43 |
| 2010/0043004 A1 * | 2/2010 | Tambi ................. | G06F 11/3433 |
| | | | 718/103 |
| 2013/0097459 A1 | 4/2013 | Bell et al. ....................... | 714/37 |
| 2014/0095939 A1 | 4/2014 | Bell et al. ....................... | 714/39 |

* cited by examiner

SYSTEM AND METHOD FOR IN-SERVICE DIAGNOSTICS BASED ON HEALTH SIGNATURES

CROSS REFERENCES TO RELATED APPLICATIONS

This application is a continuation application of U.S. patent application Ser. No. 13/790,033 entitled "System and Method for In Service Diagnostics Based on Health Signatures" which was filed on Mar. 8, 2013 and is incorporated herein by reference in its entirety for all purposes.

TECHNICAL FIELD

The present disclosure relates generally to information handling systems, and, more particularly, to a system and method for in-service diagnostics based on health signatures.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. Such information handling systems may be servers, laptop computers, desktop computers, or any other type of electronic device capable of storing and retrieving data.

An information handling system will typically include some type of temporary information storage medium, such as random access memory (RAM). The amount of memory included in an information handling system may be on the order of gigabytes or may be greater or smaller depending on the operational requirements of the information handling system. As memory size increases, the likelihood that part of the memory will either be manufactured defective or become defective over time increases. If left unmanaged, the presence of defective memory cells, regardless of their size, can cause the information handling system to fail. Such failure can initiate an abrupt end to the current operation of the information handling system, resulting in the loss of critical data. A memory failure could also prevent the information handling system from starting up or booting up altogether.

As information handling systems continue to evolve and computer technology advances, the operational relationship between the CPU and memory becomes more significant and complex. Many attributes of modern systems (specifically, the introduction of multi-core processors and virtualization) are contributing to an ever-larger memory footprint within a typical information handling system. Consequently, not only is system memory becoming a much more substantial percentage of the overall cost of the information handling solution, the impact of erroneous behavior in the memory can have a much more adverse effect on the life cycle expense associated with the information handling system.

An information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

SUMMARY

The present disclosure relates generally to information handling systems and, more particularly, to systems and methods for providing in-service diagnostics based on health signatures.

In one aspect, a method for providing in-service diagnostics in an information handling system having a non-transitory computer readable storage medium is disclosed. A plurality of parameters indicative of the health of the information handling system and its components are monitored. Data related to the plurality of parameters is stored on the non-transitory computer readable storage medium. The data is analyzed to detect a health signature of the information handling system. Based on the health signature, a diagnostic test is selected. The diagnostic test is scheduled and executed, and if the diagnostic test fails, an alert is sent to a system administrator.

In another aspect, a non-transitory computer readable storage medium comprising executable instructions is disclosed. Those instructions cause at least one processor coupled to the computer readable storage medium to monitor a plurality of parameters indicative of the health of the information handling system and its components. Data related to the plurality of parameters is stored on the non-transitory computer readable storage medium. The data is analyzed to detect a health signature of the information handling system. Based on the health signature, a diagnostic test is selected. The diagnostic test is scheduled and executed, and if the diagnostic test fails, an alert is sent to a system administrator.

In yet another aspect, an information handling system comprising at least one processor and a non-transitory computer readable storage medium, comprising instructions and coupled to the processor, is disclosed. The instructions cause the at least one processor to monitor a plurality of parameters indicative of the health of the information handling system and its components. Data related to the plurality of parameters is stored on the non-transitory computer readable storage medium. The data is analyzed to detect a health signature of the information handling system. Based on the health signature, a diagnostic test is selected. The diagnostic test is scheduled and executed, and if the diagnostic test fails, an alert is sent to a system administrator.

The system and method disclosed herein are technically advantageous because faults and impending failures of an information handling system and its components can be screened early and proactively, instead of waiting until the system fails in an unscheduled manner. By storing the data related to the parameters indicative of the health of the information handling system and its components, the present disclosure provides technicians with current and accurate health signature data and diagnostic service results, which allows for a faster and more accurate break-fix. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
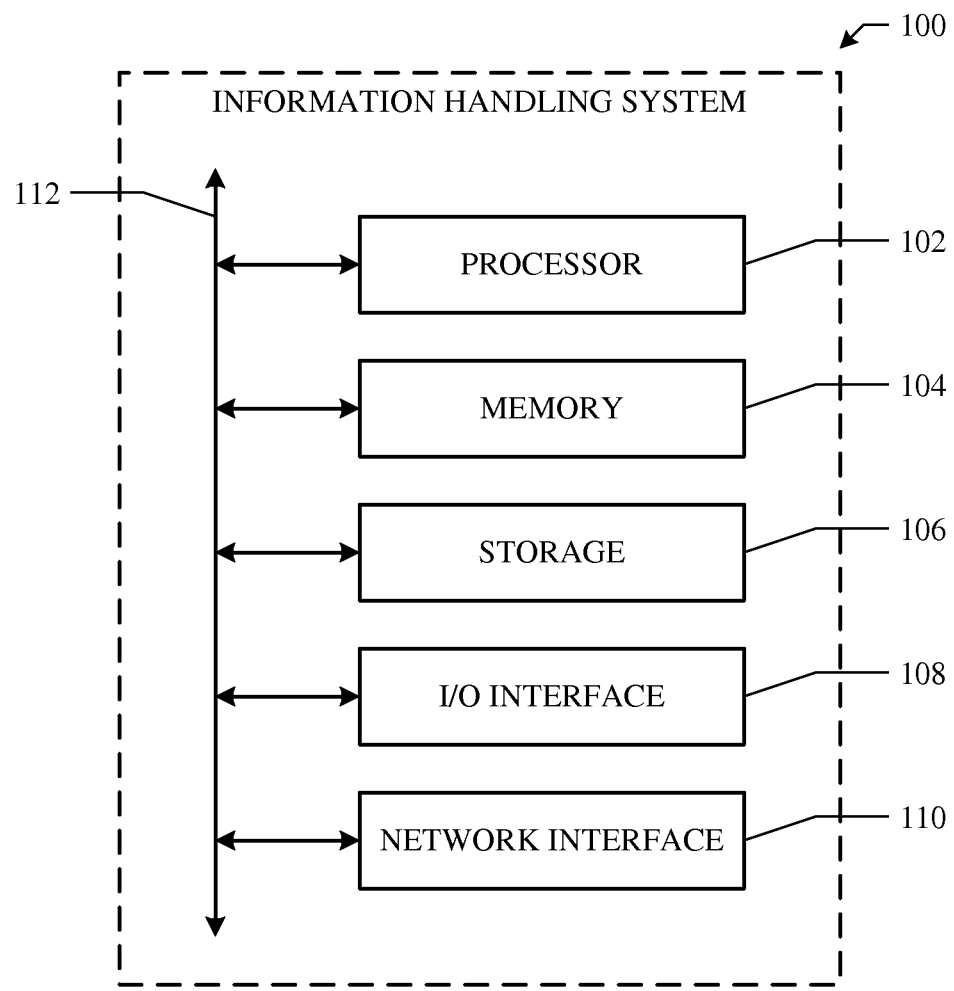
FIG. 1 illustrates an example information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), system management RAM (SM-RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

For the purposes of this disclosure, computer-readable storage media may include any instrumentality or aggregation of instrumentalities that may retain data and/or instructions for a period of time. Computer-readable storage media may include, for example, without limitation, storage media such as a direct access storage device (e.g., a hard disk drive or floppy disk), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The present disclosure is now described in detail with reference to a few embodiments thereof illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Shown in FIG. 1 is a block diagram of an example information handling system 100, in accordance with certain embodiments of the present disclosure. Information handling system 100 may be a personal computer system or an enterprise computer system, or may be configured and used for any purpose known to one of ordinary skill in the art. In one or more embodiments, information handling system 100 may perform one or more steps of one or more methods described or illustrated herein or provide functionality described or illustrated in this disclosure. In other embodiments, software running on one or more information handling system 100 performs one or more steps of one or more methods described or illustrated herein or provides functionality described or illustrated herein. Particular embodiments include one or more components of one or more information handling systems 100.

While FIG. 1 illustrates an example information handling system 100, this disclosure contemplates any number of information handling systems 100 connected to form a system suitable for a given operation or functionality as known to one of ordinary skill in the art. As an example and not by way of limitation, information handling system 100 may be an embedded computer system, a desktop computer system, a laptop or notebook computer system, an interactive kiosk, a mainframe, a server, or any other computing device known to one of ordinary skill in the art. The information handling system 100 may also include one or more of any of the aforementioned devices. Where appropriate, information handling system 100 may include one or more information handling systems 100; be unitary or distributed; span multiple locations; span multiple machines; or reside in a cloud, which may include one or more cloud components in one or more networks and may include one or more client/server devices. Where appropriate, one or more information handling systems 100 may perform without substantial spatial or temporal limitation one or more steps of one or more methods described or illustrated herein. As an example, one or more steps of one or more methods described or illustrated herein may be performed by information handling system 100 at different times or at different locations where appropriate.

In one or more embodiments, information handling system 100 includes a processor 102, memory 104, storage 106, an input/output (I/O) interface 108, a network interface 110, and a bus(es) 112. Although this disclosure describes and illustrates a particular information handling system 100 having a particular set of particular components in a particular arrangement, this disclosure contemplates any suitable information handling system having any suitable combination and arrangement of components as known to one of ordinary skill in the art.

In an example embodiment, processor 102 may include hardware and software components for the structure and operation of the process steps and system disclosed. While not specifically shown, it should be understood that any number of program modules comprising computer-readable instructions may be stored in the information handling system storage 106 or other memory and may be executed by processor 102. Storage 106 or memory 104 or other such memory may be a hard disk, magnetic disk, optical disk, ROM, RAM or any other computer media known to one of ordinary skill in the art for the storage and retrieval of data, including executable or computer-readable instructions. Upon execution of the computer-readable instructions, certain actions may be performed as described in this disclosure.

In another embodiment, memory 104 includes main memory for storing instructions for processor 102 to execute or data for processor 102 to operate on. As an example, information handling system 100 may load instructions for execution from storage 106 or another source (such as, for example, another information handlings system 100, an external memory source, a remote memory source, or any other memory source known to one of ordinary skill in the art) to memory 104. Bus 112 may include one or more buses for connecting processor 102, memory 104, storage 106, I/O interface 108 and network interface 110.

In another embodiment, I/O interface 108 includes hardware, software, or both providing one or more interfaces for communication between information handling system 100 and one or more I/O devices. Information handling system 100 may include one or more I/O devices, where appropriate. One or more of these I/O devices may enable communication between an individual or other software and information handling system 100. As an example, an I/O device may include a keyboard, keypad, microphone, monitor, mouse, or any other I/O device known to one of ordinary skill in the art or a combination of two or more I/O devices. For example, the I/O device may allow an individual or other software to alter the mode of operation, for example, the maintenance mode, of information handling system 100 or to alter certain management, maintenance, or other system variables, including, for example, altering variables to update or upgrade firmware, hardware, software or any combination thereof. I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, the disclosure contemplates any suitable I/O interface.

In an example embodiment, network interface 110 includes firmware, hardware, software, or any combination thereof for providing one or more interfaces for communication (for example, packet-based communication) between information handling system 100 and one or more other information handling system 100 on one or more networks. For example, network interface 110 may include a network interface controller (NIC) or network adapter for communicating with a telephone network, an Ethernet or other wire-based network or a wireless NIC (WNIC) or wireless adapter for communicating with a wireless network, such as a WI-FI network, or any other network interface for communicating with any type of network known to one of ordinary skill in the art.

In an example embodiment, bus 112 includes hardware, software, or both which couples components of information handling system 100 to each other. Bus 112 may include one or more buses where appropriate and may communicatively, physically, virtually, or otherwise as required couple the components of information handling system 100 to each other.

Figure 2:
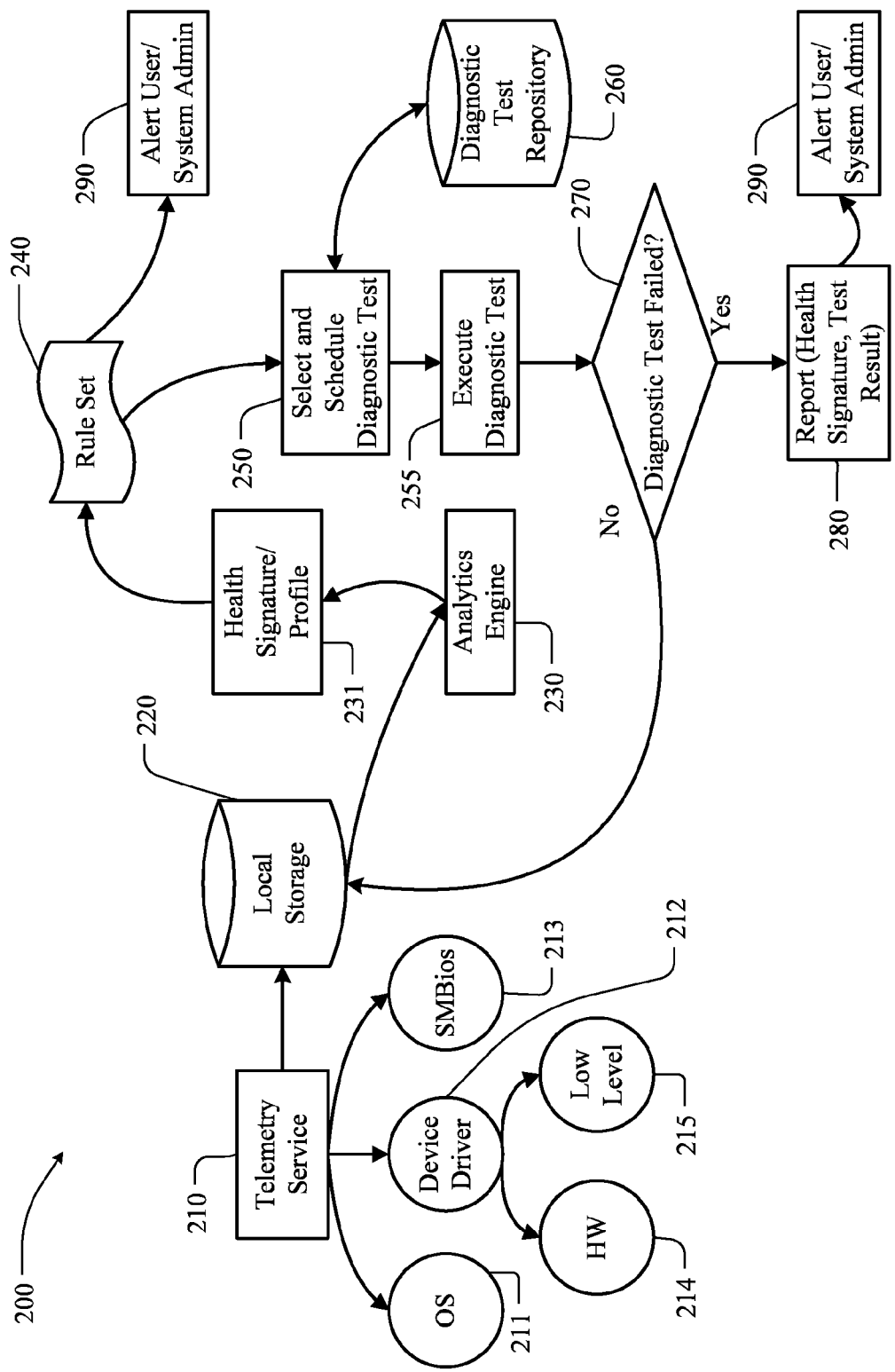
FIG. 2 illustrates a flow diagram in accordance with certain embodiments of the present disclosure.

FIG. 2 illustrates an example configuration of a system 200 implementing a method for providing in-service diagnostics in an information handling system. In one embodiment, diagnostic tests 255 are selectively launched while the information handling system is in-service, based on real time or near real time awareness of system health and performance conditions, as further explained below.

The health of the information handling system and components thereof is periodically probed by telemetry service 210. Telemetry service 210 may be a telemetry based software agent that runs in the background as an operating system service in the information handling system. Telemetry service 210 polls a set of probes from various interfaces on the host system. Those probes and interfaces include, but are not limited to, Windows Management Instrumentation ("WMI"), System Management BIOS ("SMBIOS") 213, Operating System ("OS") interfaces 211, BIOS, and directly from hardware devices using device drivers 212 including low level 215 and hardware level 214 drivers, interfaces, and supporting libraries. This polling may be carried out continuously and in a manner not visible to the end-user of the HIS. Alternatively, polling may also be carried out on-demand, at predetermined intervals, or upon the occurrence of a system event such as, for example, a resume from sleep mode or reboot.

System 200 tracks parameters obtained from telemetry service 210 that are indicative of system and component health and performance, including but not limited to thermistors, fan speeds, battery BMU data, BIOS logs, OS crashes, and connector mating. These parameters are tracked while the information handling system is in-service, and resultant values are stored in Local Storage 220 of the information handling system in a circular file with a time-stamp, similar to a flight data recorder.

Analytics Engine 230 is a collection of proprietary algorithms that process the data to identify anomalies and outliers and to detect Health Signatures 231 that are precursors to potential service incidents. Rule Set 240 is an ensemble of business rules that match Health Signatures 231 to potential actions. For example, a set of actions could indicate a critical Alert 290 that is communicated to the User or the System Administrator. Another set of actions could involve selecting 250, scheduling 250, and executing a diagnostic test 255 to collect more information on the health condition of the information handling system and thereafter creating a Report 280 that is sent as an Alert 290 to the User or the System Administrator that includes the Test Result 270 and the Health Signature 231. As previously mentioned, System 200 may schedule one or more diagnostic tests 255 while the information handling system is operational and in-service. For certain diagnostic tests 255 that cannot be run while the OS is operational, System 200 can schedule the diagnostic test 255 to be run during the next reboot.

An appropriate diagnostic test 255 is selected from Diagnostic Test Repository 260 and executed by System 200 based on the Health Signature 231 reported by Analytics Engine 230. Diagnostic Test Repository 260 may be stored in various locations including but not limited to locally, on an internal or external network, or in cloud storage. Diagnostic Test Repository may contain diagnostic tests including but not limited to primary battery tests, battery charger tests, system fan tests, memory tests, storage device tests, system device tests, USB device tests, display panel tests, video card tests, cable tests, and processor tests. If a system or component fails the diagnostic test, then the Test Result 270, along with the Health Signature 231, are communicated to the User or the System Administrator in a Report 280 that is sent as an Alert 290. Report 280 can be used for issue resolution, automated part dispatch, or to assist help center technicians. Test Result 270 is also stored in Local Storage 220. If the Test Result indicates failure of a diagnostic test, Test Result 270 may be archived to a persistent storage file in Local Storage 220. If the Test Result 270 indicates passing of a diagnostic test, Test Result 270 may be added to the circular file in Local Storage 220.

One embodiment of System 200 may be the Dell Client System Analyzer ("DSCA"). DSCA contains a Telemetry Service 210 that includes Enhanced Pre-Boot System Assessment ("ePSA") libraries, which can obtain data from multiple sources, including but not limited to the BIOS-Test Interface, Dell's Platform Advanced Integrated Diagnostics interface ("PAID"), and directly from the hardware. DSCA also includes Analytics Engine 230, which includes a collection of algorithms to process the data for identifying anomalous health and performance conditions. DSCA further includes Diagnostic Test Repository 260, in this embodiment the Dell ePSA test suite, which includes test algorithms that can be executed while the OS is operational as well as test algorithms that must be run on reboot. Diagnostic Test Repository 260 may be stored in various locations including but not limited to locally, on an internal or external network, or in cloud storage.

Figure 3A:
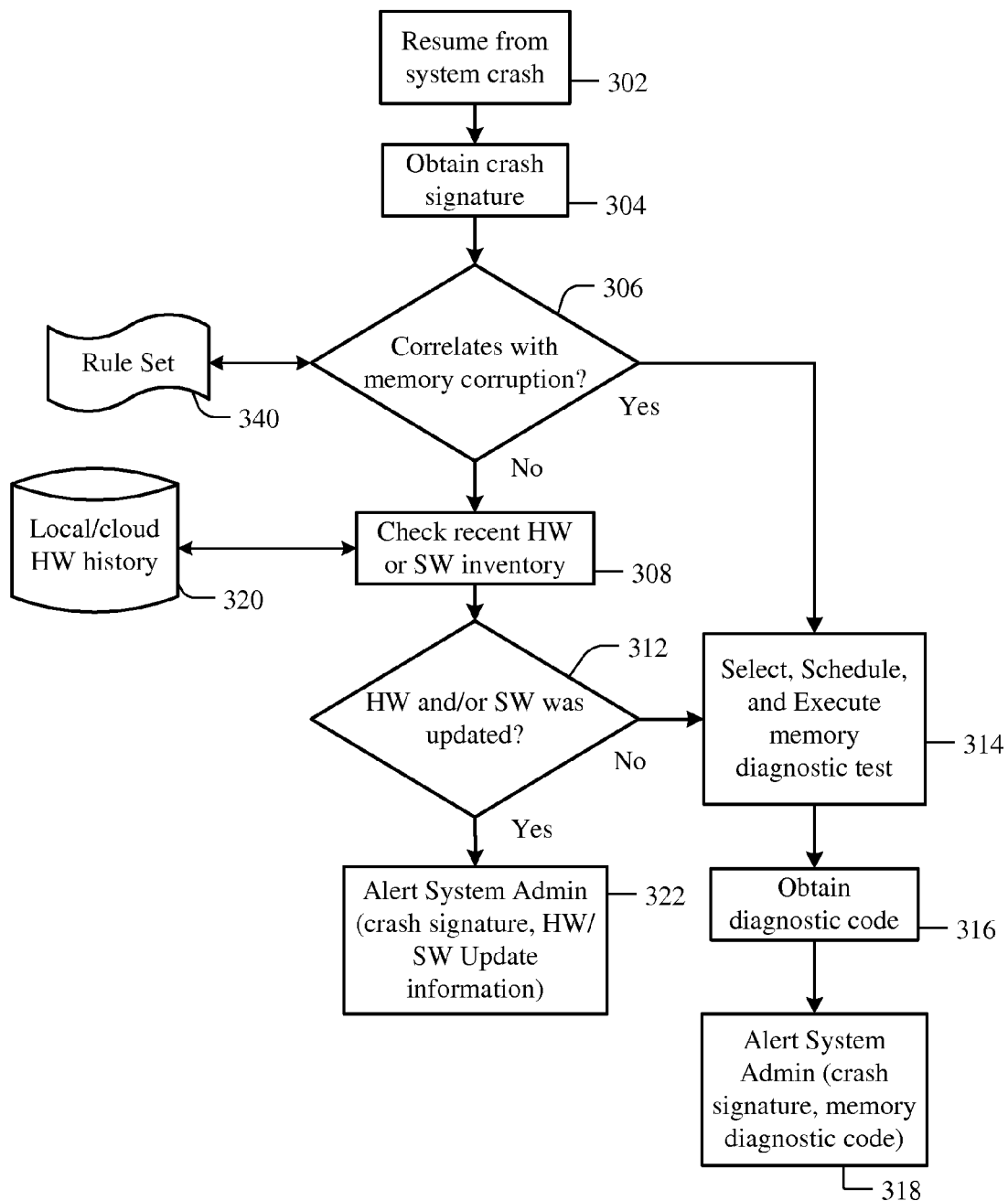
FIGS. 3a-3c illustrate flow diagrams of exemplary applications of certain embodiments of the present disclosure related to memory in an information handling system.
Figure 3B:
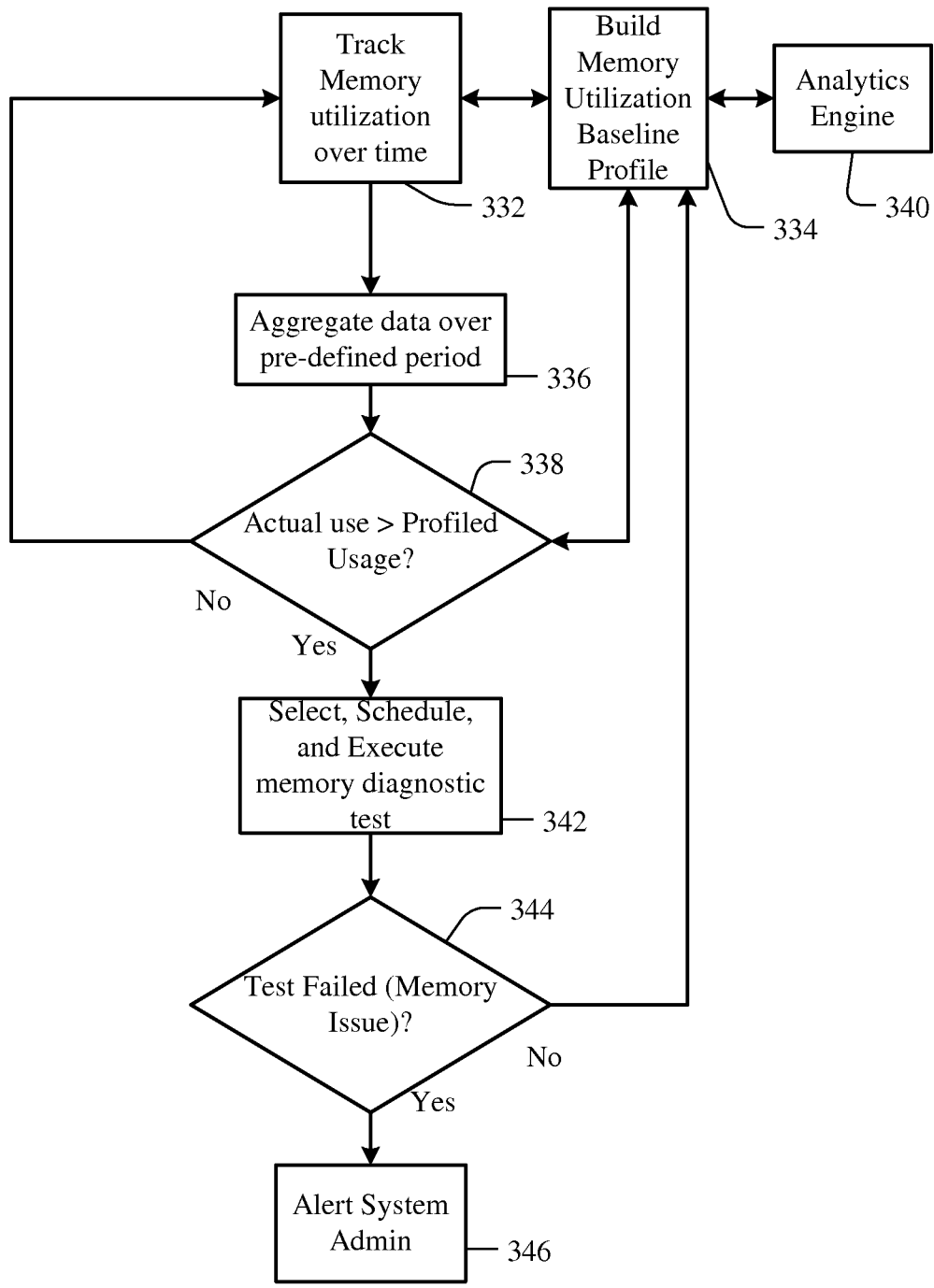
Figure 3C:
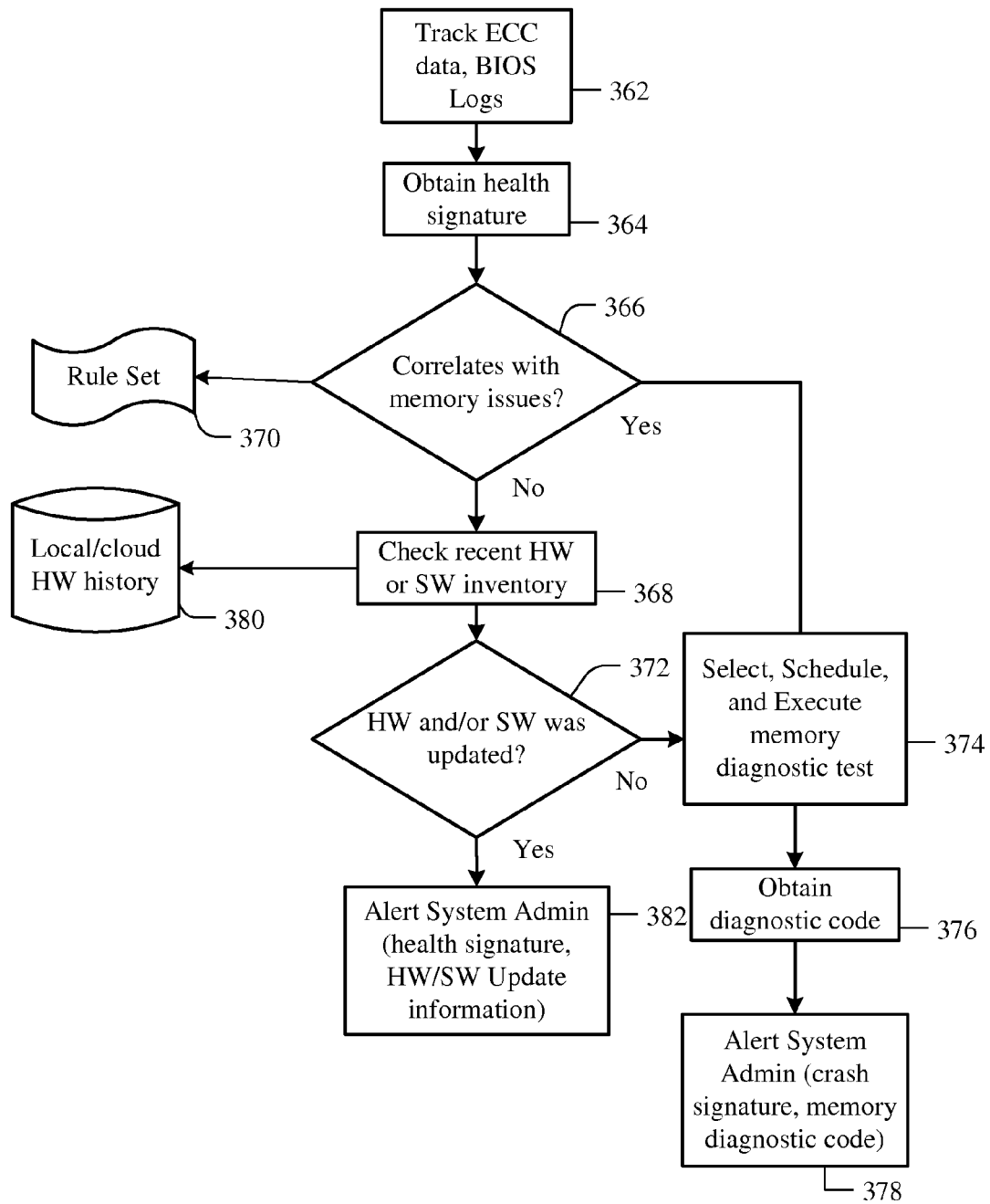

FIGS. 3a-3c illustrate flow diagrams of exemplary applications of certain embodiments of the present disclosure related to memory in an information handling system.

Referring now to FIG. 3a, illustrated is a flow diagram of an exemplary application of certain embodiments of the present disclosure, particularly an application wherein the information handling system is resuming from a system crash. At step 302, System 200 senses that the information handling system is resuming from a system crash. At step 304, System 200 obtains a crash health signature, which may contain crash data including but not limited to the error code, the crashing driver, or a crashing application. The Rule Set 310 contains correlations between the crash health signature and possible hardware issues. At step 306, System 200 conducts a search of Rule Set 310 to determine if the crash health signature is associated with memory corruption. If the crash health signature is associated with memory corruption, System 200 proceeds to step 314 where it selects, schedules, and executes a memory diagnostic test. At step 316, a diagnostic code, also known as a validation code, is obtained from the selected diagnostic test. At step 318, an Alert is sent to a System Administrator including the crash health signature and the memory diagnostic code.

If the crash health signature is not associated with memory corruption at step 306, System 200 proceeds to step 308, where it scans system logs and its own history, Local/cloud HW history 320, to check for changes in the hardware (HW) or software (SW) configuration. Based on the results of the scan, at step 312, a determination is made whether HW and/or SW was updated. If HW and/or SW was updated, then at step 322 an Alert is sent to a System Administrator including the crash health signature and HW/SW Update information. If HW and/or SW was not updated, then System 200 proceeds to step 314 and continues as described above.

Referring now to FIG. 3b, illustrated is a flow diagram of an exemplary application of certain embodiments of the present disclosure, particularly an application wherein there has been an unexpected increase in memory usage in the information handling system. At step 332, System 200 tracks memory utilization through, for example, memory usage variables such as Free Physical memory, Available Memory, and Paging activity every few seconds (as per predefined intervals set in a configuration setup). In step 336, data is aggregated over a pre-defined period, which in one embodiment is a default 24-hour period. At step 334, System 200 performs analytics, using Analytics Engine 340, to calculate descriptive statistics such as mean, median, variance, and max, and all values for each variable are binned into predetermined buckets to create a histogram. The variables are tracked and the histograms are updated over several days or weeks depending on the selected configuration. This provides enough time to collect data to cover various usage modes. This data becomes the baseline for future comparisons. At step 338, at each pre-defined interval (in one embodiment, every 24 hours), the histogram and descriptive statistics are calculated and compared to the Memory Utilization Baseline Profile. If the Actual use is greater than the Profiled Usage, and thus memory usage has increased, then a memory diagnostic test is selected, scheduled, and executed at step 342. If at step 344 it is determined that the diagnostic test failed, indicating that there is a memory defect, then the System Administrator, which may be a user, an IT administrator, or a local administrator, among other administrators, can be alerted at step 346. If the diagnostic test passes, then the new set of data is used to update the Baseline usage profile for the system at step 334.

The application illustrated in FIG. 3b may also be modified to provide tracking and diagnostics for hard disk drives (HDDs) in the information handling system. For example, System 200 may track and analyze several variables that are indicative of HDD health at step 332. For example, the read/write activity on each HDD may be tracked. The set of variables may also include variables read from an interface such as the HDD SMART (Self-Monitoring and Reporting Technology) interface, which is an industry standard interface. SMART provides access to multiple variables that track HDD use, performance, and health. System 200 may track and log changes in critical HDD variables such as reallocated sectors, spin-up time, read errors, and daily volumes of reads and writes over a predefined period, at step 336. At step 334, a baseline usage profile may be created for certain variables, which becomes the baseline for future comparisons. Any increase in the variable values above a threshold is used for selecting, scheduling, and executing a HDD diagnostic test at steps 338, 342, and 344, and an alert may be sent to a System Administrator at step 346.

A further modification of the application illustrated in FIG. 3b would provide optical drive diagnostics based on performance degradation and errors. System 200 may track and analyze several variables that are indicative of Optical Drive health at step 332. For example, System 200 may track, aggregate, and analyze spin up speed, decreases in overall RPM, data read errors, and/or usage time in steps 332 and 336. Using the initial data, a baseline usage profile that may be a histogram is created for variables such as daily usage, spin up, and read errors in step 334, and this data becomes the baseline for future comparisons. The histogram is generated after every 24 hour interval (or other preconfigured duration) using the most recent data and is compared to baseline. If there is deviation in the data, then the Optical Drive Built-in Self Test (OBIST) diagnostic is selected, scheduled, and executed at steps 338, 342, and 344, and an alert may be sent to a System Administrator at step 346.

Referring now to FIG. 3c, illustrated is a flow diagram of an exemplary application of certain embodiments of the present disclosure, particularly an application wherein the information handling system has experienced memory errors from Error Checking and Corrections ("ECC") or memory-related BIOS events. At step 362, System 200 detects an error from its tracking of ECC data and BIOS events after every boot or system resume from sleep. Error codes related to motherboard and/or Memory issues, which may include error codes concerning whether memory is installed, whether there is a system board error, whether there is an LCD connection error, whether there is a memory compatibility error, whether memory is detected but nonetheless has errors, whether there is a modem error, whether there is a ROM error, whether there is a storage device error, and whether there is a video card error, may be used to trigger a memory diagnostic test. At step 364, System 200 obtains a health signature for the information handling system, which may contain information about the memory error or event including but not limited to a particular error code, a BIOS event, or an affected memory area. The Rule Set 370 contains correlations between the health signature and possible memory issues. At step 366, System 200 conducts a search of Rule Set 370 to determine if the health signature is correlated with memory issues. If the health signature is associated with memory issues, System 200 proceeds to step 374 where it selects, schedules, and executes a memory diagnostic test. At step 376, a diagnostic code, also known as a validation code, is obtained from the selected diagnostic test. At step 378, an Alert is sent to a System Administrator including the health signature and the memory diagnostic code.

If the health signature is determined to not be correlated with memory issues at step 366, System 200 proceeds to step 368, where it scans system logs and its own history, Local/cloud HW history 380, to check for changes in the hardware (HW) or software (SW) configuration. Based on the results of the scan, at step 372, a determination is made whether HW and/or SW was updated. If HW and/or SW was updated, then at step 382 an Alert is sent to a System Administrator including the health signature and HW/SW Update information. If HW and/or SW was not updated, then System 200 proceeds to step 374 and continues as described above.

Figure 4:
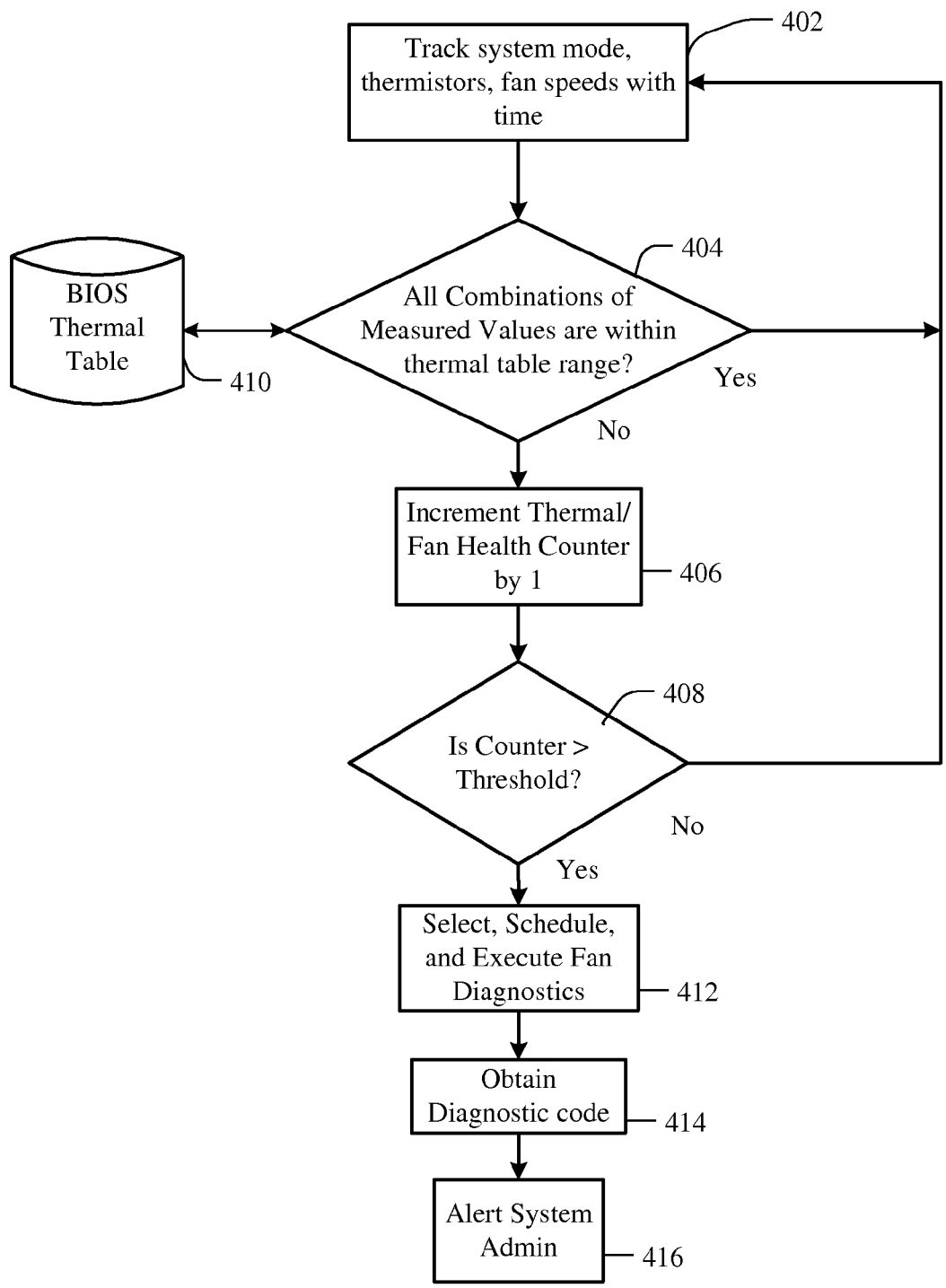
FIG. 4 illustrates a flow diagram of an exemplary application of certain embodiments of the present disclosure related to temperatures in an information handling system.

FIG. 4 illustrates a flow diagram of an exemplary application of certain embodiments of the present disclosure related to temperatures in an information handling system. At step 402, System 200 tracks the system operational mode, CPU core temperature, thermistors, and fan speeds. Variables relating to temperatures include but are not limited to CPU DTS, DIMM, Skin, Video, and fan rpms when the system is operational. These variables are tracked over duration of time, and their values are compared to their expected values set by the BIOS Thermal Table 410 as well as to each other to ensure correlation as shown in the BIOS Thermal Table 410. If it is determined in step 404 that the measured values are not within a range as defined in the BIOS Thermal Table 410, then a counter for fan health is initiated at step 406. On each run, the variables are scanned at step 402 and compared with the thermal table at step 404. If the values are determined to be out of range as defined in the BIOS Thermal Table 410, then the counter is incremented by one at step 406 and compared to a set threshold at step 408. When the counter is determined to have reached the set threshold at set 408, then at step 412 a thermal and fan diagnostic is selected, scheduled, and executed. The thermal and fan diagnostics may be from, for example, ePSA modules. If the test fails at step 412, then at step 414 a Diagnostic Code is obtained. The Diagnostic Code may be a validation code. At step 416, the Diagnostic Code along with records of the supporting events are sent as an Alert message to the System Administrator for dispatching a fan or fans.

The application illustrated in FIG. 4 may also be extended to trigger a processor test. In case of thermal issues with an information handling system, it is often the case that either the fan is not working correctly and/or the heat sink is compromised. At step 412, a processor diagnostic test may be run. The processor diagnostic test may run a stress test that would expose a compromised heat sink. In addition to comparing measured thermistor values with the values in the BIOS Thermal Table 410, System 200 may also track BIOS-recorded thermal events such as over-temperature shutdowns and thermal trips. Also, both the processor diagnostic test and the Fan Diagnostic can be selected, scheduled, and executed based on an increase in the frequency of over-temperature events.

Figure 5:
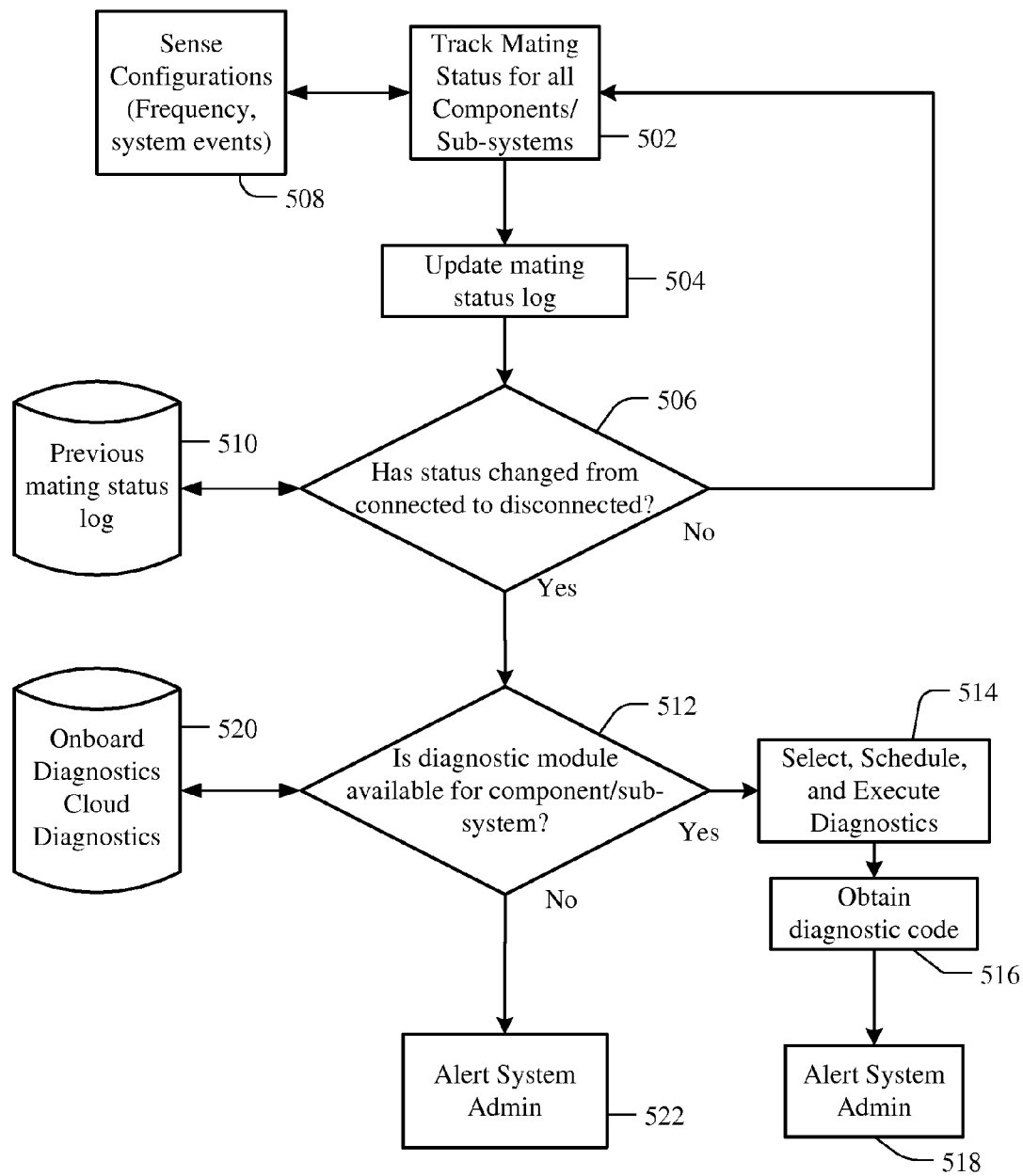
FIG. 5 illustrates a flow diagram of an exemplary application of certain embodiments of the present disclosure related to device connections in an information handling system.

FIG. 5 illustrates a flow diagram of an exemplary application of certain embodiments of the present disclosure related to device connections in an information handling system. At step 502, System 200 Tracks the Mating Status for all Components and Sub-systems. System 200 may track the mating status through the use of Enhanced Pre-Boot System Assessment (ePSA) libraries. The ePSA libraries may be part of an install package for System 200. The ePSA libraries can obtain data from multiple sources such as the BIOS-Test interface, Dell's Platform Advanced Integrated Diagnostics interface (PAID), and directly from hardware. At any time System 200 can request the mating status of connections from all supported devices in the system at step 502 and sense configurations in step 508. These steps may be carried out in a manner not visible to the end-user of the HIS. Alternatively, these steps may also be carried out on-demand, at predetermined intervals, or upon the occurrence of a system event such as, for example, a resume from sleep mode or reboot. The results of the connection health status are stored in a local mating status log at step 504 and updated to track changes over time. If at step 506 a change in status from connected to disconnected is detected by comparison to previous mating status log 510, then at step 512 it is determined, by a search of Onboard Diagnostics Cloud Diagnostics 520, whether diagnostic modules for this component or sub-system are available. If diagnostic modules are available, then a diagnostic is selected, scheduled, and executed at step 514, after which a diagnostic code is obtained at step 516, and an alert is sent to a System Administrator at step 518. If diagnostic modules are not available, then an alert is sent to a System Administrator at step 522. The application illustrated in FIG. 5 is particularly valuable for diagnosis where connection failures are intermittent, for example "could not duplicate" or "no fault found."

Figure 6A:
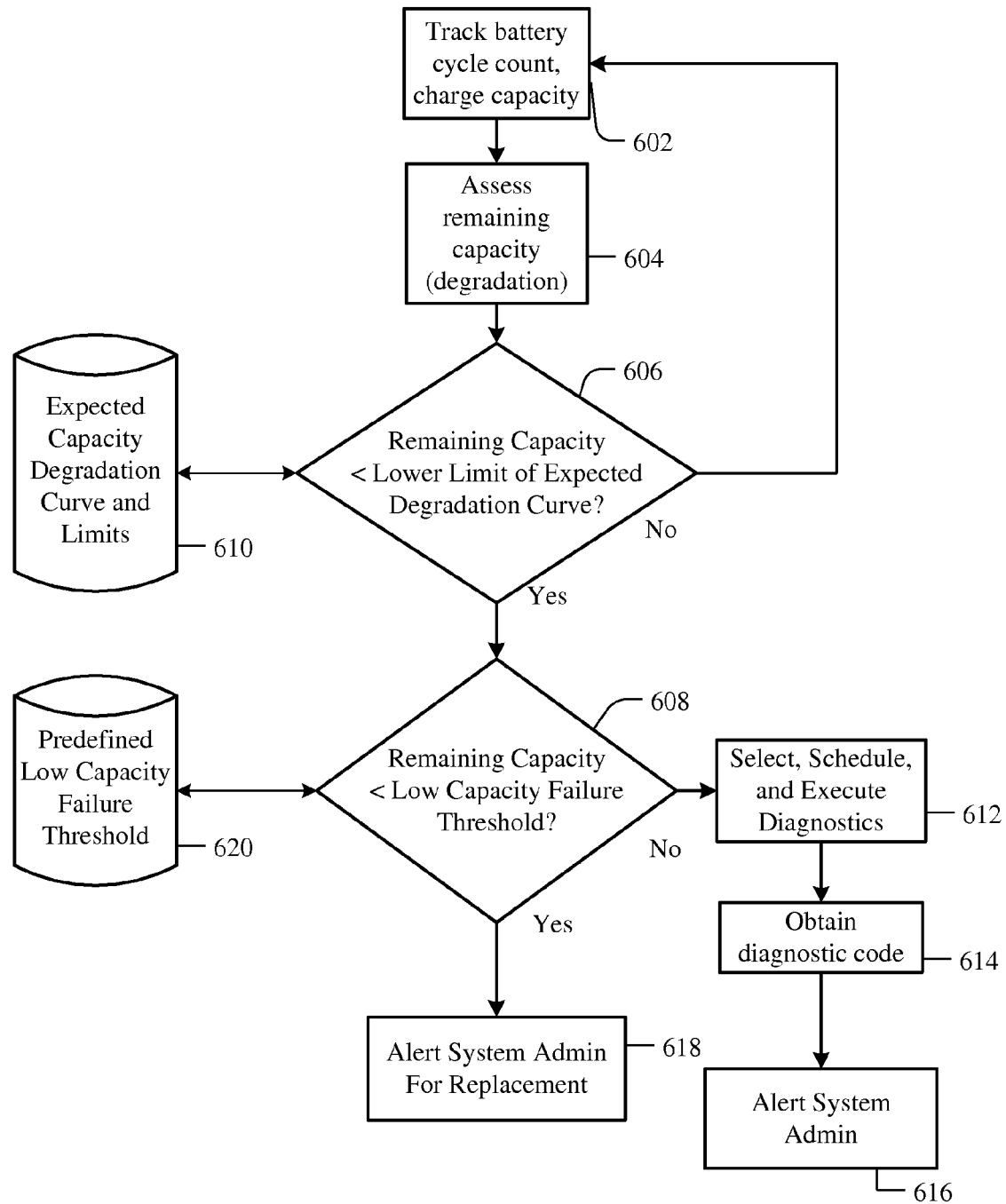
FIGS. 6a-6c illustrate flow diagrams of exemplary applications of certain embodiments of the present disclosure related to batteries in an information handling system.
Figure 6B:
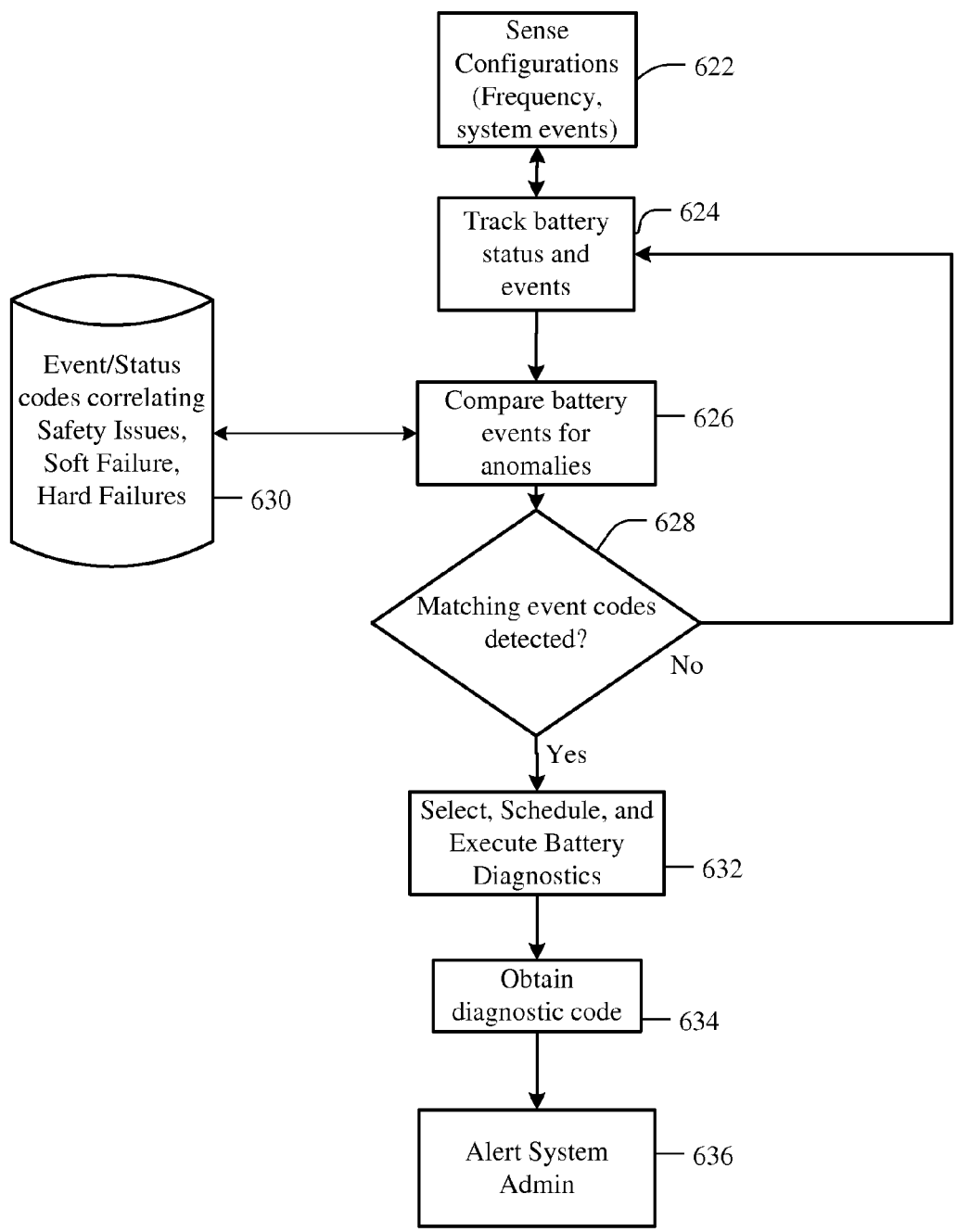
Figure 6C:
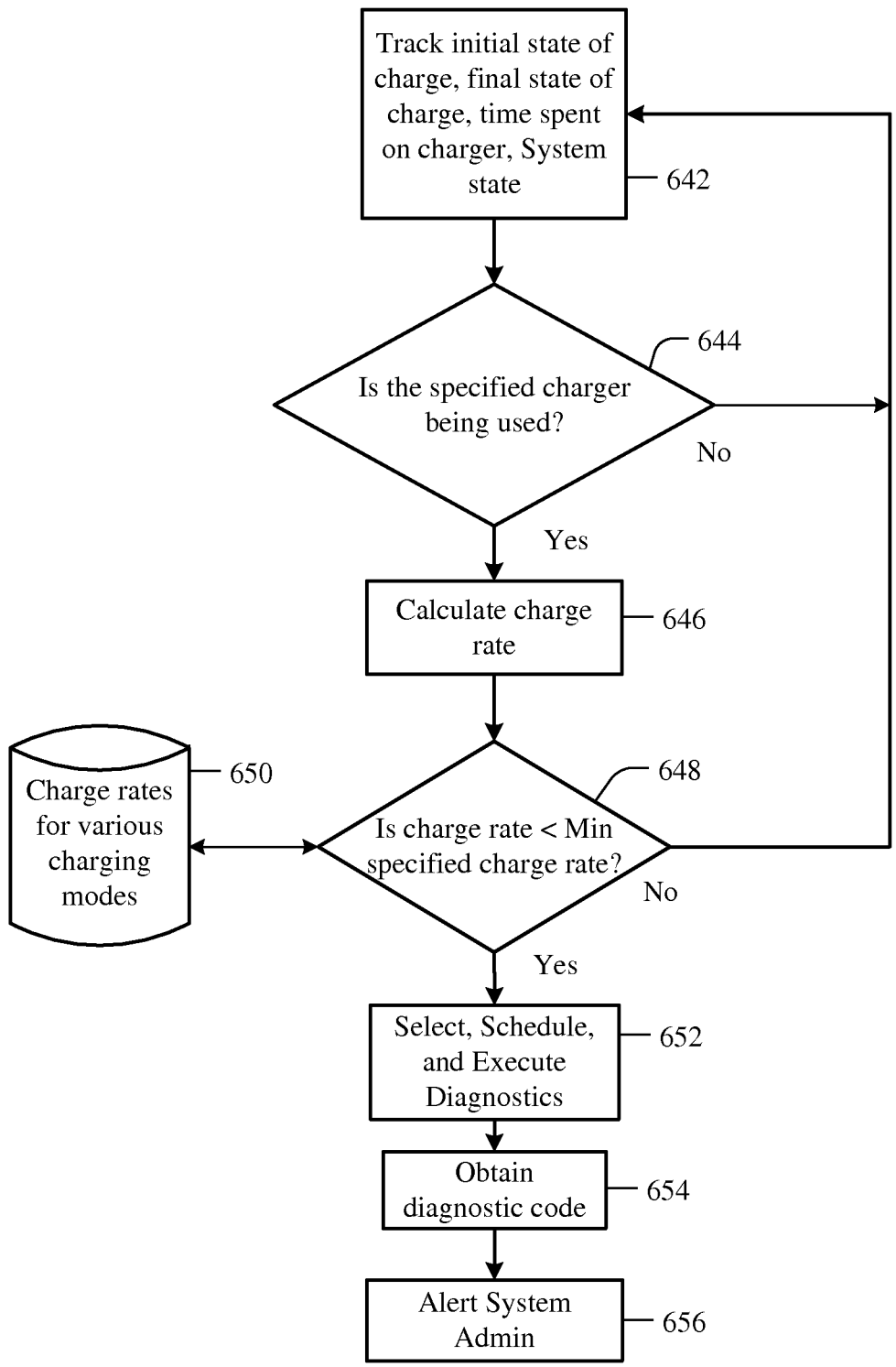

FIGS. 6a-6c illustrate flow diagrams of exemplary applications of certain embodiments of the present disclosure related to batteries in an information handling system.

Turning to FIG. 6a, System 200 may track increments in battery cycles and any resulting decrease in the battery charge capacity over time at step 602. As the battery is used over time, the capacity decrease should follow an Expected Capacity Degradation Curve 610 along with some variation. Remaining capacity is assessed at step 604. At step 606, it is determined whether the remaining capacity is less than the lower limit of the Expected Degradation Curve 610. The Expected Degradation Curve 610 may be stored locally. Expected degradation curves are defined for particular battery models and may depend on specification, design capacity, and cell technology. Expected curves are verified during the battery development process using reliability tests on large samples. Any sudden decrease in the capacity is an alerting condition and is used to schedule a battery diagnostic. Thus, if it is determined at step 606 that the remaining capacity is less than the lower limit of the expected degradation curve, then at step 608 it is determined whether the remaining capacity is less than Predefined Low Capacity Failure Threshold 620. If so, then an Alert is immediately sent to a System Administrator at step 618 for replacement of the battery. If not, then at step 612 a battery diagnostic test is selected, scheduled, and executed. A diagnostic code is obtained at step 614, and an Alert is sent to a System Administrator at step 616.

Referring now to FIG. 6b, System 200 senses battery configurations in step 622 and tracks and logs battery status and events at step 624. Battery status and events may be tracked using battery Manufacturer Access (MA) codes, which provide manufacturer specific battery status information. The 16 bit MA codes provide the system detailed information on the inner workings of the battery and in the event of failure, a means by which the failure mode can be determined. The codes are indicative of soft failures/faults as well as hard failure. At step 626, battery events are compared with codes correlating Safety Issues, Soft Failure, and Hard Failures 630. If matching event codes are detected at step 628, then a battery diagnostic test is selected, scheduled, and executed at step 632. A diagnostic code is obtained at step 634, and an Alert is sent to a System Administrator at step 636.

Referring now to FIG. 6c, System 200 periodically tracks at step 642 the initial state of charge, the final state of charge, the time spent on the charger, the system state, and the relative state of charge (RSOC) of the battery. If it is determined at step 644 that the specified charger is being used, then the charge rate is calculated at step 646 and compared to the minimum specified charge rate for the battery at step 648 (as indicated in Charge Rates for Various Charging Modes 650). The battery may have different charge rates for charge modes such as express charge, constant current constant voltage (CCCV), and trickle charge. If it is determined at step 648 that the charge rate is less than the minimum specified charge rate, then a battery diagnostic test is selected, scheduled, and executed at step 652. A diagnostic code is obtained at step 654, and an Alert is sent to a System Administrator at step 656.

The application illustrated in FIG. 6c may also be extended to trigger a battery diagnostics test based on temperature. System 200 would track the battery temperature provided by the battery management unit (BMU) at step 642, and over time would log the temperature data to create a unique temperature profile for the particular combination of battery and information handling system. At step 648, the tracked battery temperature would be compared to maximum and minimum specified temperatures for the battery. If it is determined at step 648 that the temperature either varies from the expected profile or is outside of the specified limits, then a battery diagnostic test is selected, scheduled, and executed at step 652. A diagnostic code is obtained at step 654, and an Alert is sent to a System Administrator at step 656.

The concepts disclosed herein should not be understood to be limited to the exemplary embodiments described, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. A method for providing diagnostics in an information handling system having a non-transitory computer readable storage medium, the method comprising:
   sensing that the information handling system is resuming from a system crash; and
   obtaining a crash health signature, wherein the crash health signature comprises crash data;
   determining a type of crash based, at least in part, on the crash data of the crash health signature, wherein the crash health signature is indicative of at least one of memory corruption, hardware configuration, and software configuration;
   tracking one or more parameters indicative of health of the information handling system;
   storing, on the non-transitory computer readable storage medium, data related to the plurality of parameters;
   generating one or more statistics based, at least in part, on the plurality of parameters;
   selecting, based on at least one of, the crash data and at least one of the plurality of parameters, a diagnostic test to execute;
   scheduling the selected diagnostic test;
   executing the selected diagnostic test; and
   obtaining a validation code from the selected diagnostic test.

2. The method of claim 1, wherein the selected diagnostic test is scheduled and executed while the information handling system is operational.

3. The method of claim 1, wherein the selected diagnostic test is scheduled for and executed during a reboot of the information handling system.

4. The method of claim 1, further comprising:
obtaining the plurality of parameters from a telemetry service.

5. The method of claim 1, wherein the plurality of parameters are indicative of at least one of a thermistor, a fan speed, a battery data, a basic input/output log (BIOS), a crash, and a connector mating.

6. The method of claim 1, wherein the crash data comprises at least one of an error code, identification of a crashing driver, and identification of a crashing application.

7. A non-transitory, computer readable storage medium comprising executable instructions to cause at least one processor, of an information handling system, coupled to the computer readable storage medium to:
sense that the information handling system is resuming from a system crash; and
obtain a crash health signature, wherein the crash health signature comprises crash data;
determine a type of crash based, at least in part, on the crash data of the crash health signature, wherein the crash health signature is indicative of at least one of memory corruption, hardware configuration, and software configuration;
track one or more parameters indicative of health of the information handling system;
store, on the non-transitory computer readable storage medium, data related to the plurality of parameters;
generate one or more statistics based, at least in part, on the plurality of parameters;
select, based on at least one of, the crash data and at least one of the plurality of parameters, a diagnostic test to execute;
schedule the selected diagnostic test;
execute the selected diagnostic test; and
obtain a validation code from the selected diagnostic test.

8. The non-transitory, computer readable storage medium of claim 7, wherein the selected diagnostic test is scheduled and executed while the information handling system is operational.

9. The non-transitory, computer readable storage medium of claim 7, wherein the selected diagnostic test is scheduled for and executed during a reboot of the information handling system.

10. The non-transitory, computer readable storage medium of claim 7, wherein the instructions further cause the at least one processor to:
obtain the plurality of parameters from a telemetry service.

11. The non-transitory, computer readable storage medium of claim 7, wherein the plurality of parameters are indicative of at least one of a thermistor, a fan speed, a battery data, a basic input/output log (BIOS), a crash, and a connector mating.

12. The non-transitory, computer readable storage medium of claim 7, wherein the crash data comprises at least one of an error code, identification of a crashing driver, and identification of a crashing application.

13. The non-transitory, computer readable storage medium of claim 7, wherein the instructions further cause the at least one processor to:
send an alert, wherein the alert comprises at least one of the crash health signature and the validation code.

14. An information handling system, comprising:
at least one processor; and
a non-transitory, computer readable storage medium coupled to the at least one processor, wherein the non-transitory, computer readable storage medium comprises instructions that cause the at least one processor to:
sense that the information handling system is resuming from a system crash; and
obtain a crash health signature, wherein the crash health signature comprises crash data;
determine a type of crash based, at least in part, on the crash data of the crash health signature, wherein the crash health signature is indicative of at least one of memory corruption, hardware configuration, and software configuration;
track one or more parameters indicative of health of the information handling system;
store, on the non-transitory computer readable storage medium, data related to the plurality of parameters;
generate one or more statistics based, at least in part, on the plurality of parameters;
select, based on at least one of, the crash data and at least one of the plurality of parameters, a diagnostic test to execute;
schedule the selected diagnostic test;
execute the selected diagnostic test; and
obtain a validation code from the selected diagnostic test.

15. The information handling system of claim 14, wherein the selected diagnostic test is scheduled and executed while the information handling system is operational.

16. The information handling system of claim 14, wherein the selected diagnostic test is scheduled for and executed during a reboot of the information handling system.

17. The information handling system of claim 14, wherein the instructions further cause the at least one processor to:
obtain the plurality of parameters from a telemetry service.

18. The information handling system of claim 14, wherein the plurality of parameters are indicative of at least one of a thermistor, a fan speed, a battery data, a basic input/output log (BIOS), a crash, and a connector mating.

19. The information handling system of claim 14, wherein the crash data comprises at least one of an error code, identification of a crashing driver, and identification of a crashing application.

20. The information handling system of claim 14, wherein the monitoring a plurality of parameters indicative of the health of the information handling system and its components comprises monitoring parameters related to a battery in the information handling system.

* * * * *